United States Patent [19]

Eddy

[11] 3,811,551

[45] May 21, 1974

[54] APPARATUS AND METHOD FOR ORIENTING ARTICLES

[76] Inventor: William R. Eddy, c/o Phillys Petroleum, Kansas City, Mo. 74004

[22] Filed: Jan. 15, 1973

[21] Appl. No.: 323,790

[52] U.S. Cl...... 198/288, 221/156, 221/57, 198/271
[51] Int. Cl........................................... B65g 47/24
[58] Field of Search........... 198/33 R, 33 AB, 31 R; 193/43 R, 43 D; 221/156–158

[56] References Cited

UNITED STATES PATENTS 2,270,713 1/1942 Belada .......................... 193/43 D
3,342,305 9/1967 Ochs .............................. 193/43 R
2,843,254 7/1958 Vaughan ......................... 198/33 R
2,866,577 12/1958 Dimond .......................... 193/43 R

*Primary Examiner*—Richard E. Aegerter
*Assistant Examiner*—Joseph E. Valenza

[57] ABSTRACT

A method and apparatus for orienting articles having a concave side and a convex side by ejecting unoriented articles from a feedstream of said articles.

9 Claims, 4 Drawing Figures

APPARATUS AND METHOD FOR ORIENTING ARTICLES

In manufacturing, it is sometimes desirable to provide a feedstream of articles to a location for the processing. In these situations, it is often desirable to have the articles oriented in preselected manner. One example is in the packaging of ice cream and delivering lids to a capping machine with all lids being delivered in a preselected, oriented manner, for example with the convex portion uppermost.

There have been a large number of inventions for providing such a function. However, owing to the low profit margin in some operations and the necessity to provide an apparatus which is of low cost, easy to maintain, of simple construction, and which functions with a high degree of reliability and accuracy, the industry continuously strives for new methods and apparatuses for orienting articles. One particular advantage of the method and apparatus of this invention is the avoidance of the necessity of providing curvilinear pathways or chutes which sometimes malfunction, cause hangups of the articles, and can damage delicate articles.

Other aspects, objects, and advantages of the present invention will become apparent from a study of the disclosure, the appended claims, and the drawing.

The drawings are diagrammatic views of the apparatus of this invention.

Figure 1:
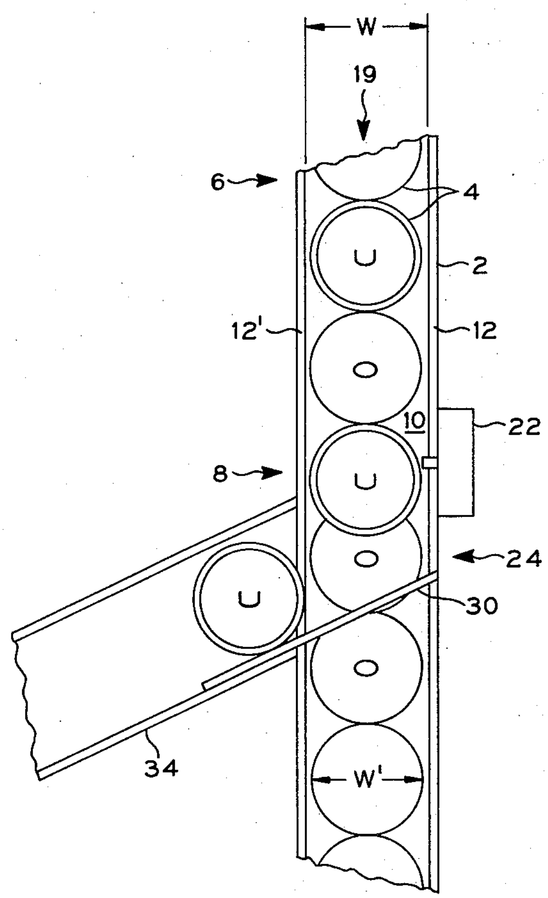
FIG. 1 shows a plan view of the apparatus with the drums removed.
Figure 2:
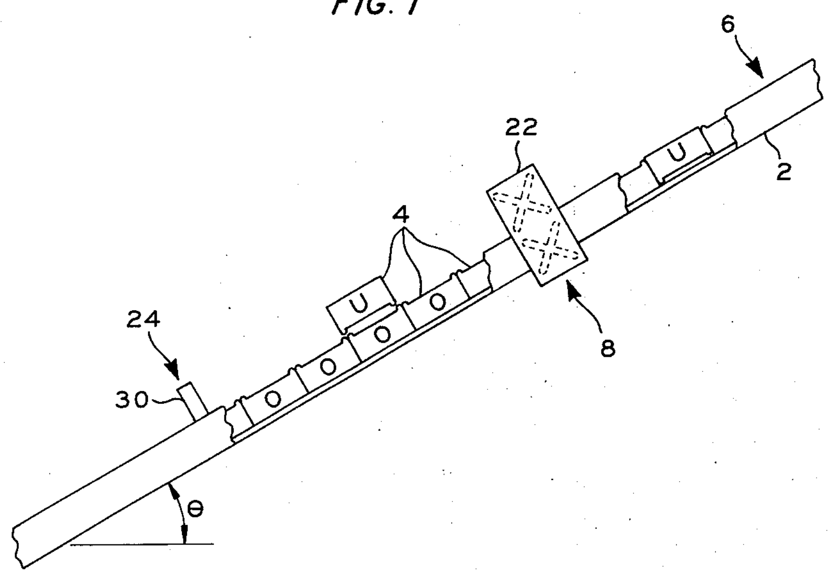
FIG. 2 shows a side view in partial section of the apparatus.

Referring to FIGS. 1 and 2, a first chute 2 receives articles 4 and passes the articles from a first location 6 to a second location 8. Chute 2 has a floor 10, side walls 12, 12' and width (W) greater than the width (W') of the articles 4. The chute 2 extends downwardly in a direction from the first location 6 toward the second location 8 at an angle preferably in the range of about 10° to about 60°. At an angle less than about 15°, the articles 4 may not be efficiently delivered to the second location 8, and at angles greater than about 45°, the vibrations and impacts subjected on the articles 4 may cause said articles to be undesirably ejected.

Figure 3:
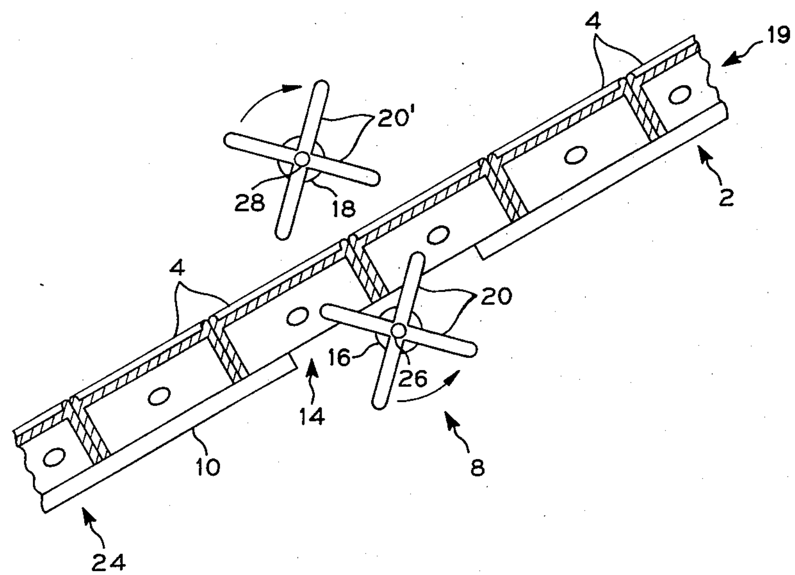
FIG. 3 shows the drums of the apparatus in their relationship to oriented articles.
Figure 4:
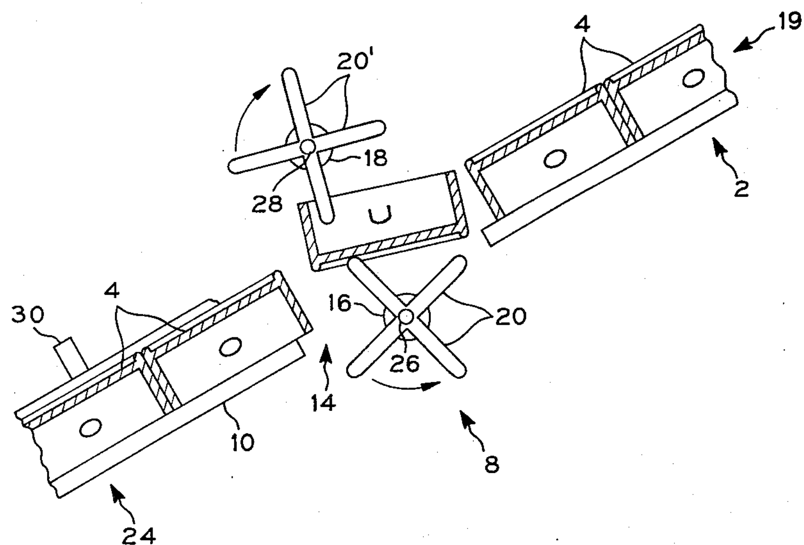
FIG. 4 shows the drums of the apparatus in their relationship and function with respect to an unoriented article.

Referring to FIGS. 3 and 4, the floor 10 of the first chute 2 has an opening 14 through the floor 10 at the second location 8.

First and second rotatable ejecting drums 16, 18, each having at least one protrusion 20 extending outwardly therefrom, are positioned at the second location 8. A power means 22 is connected to each of the drums 16, 18 for rotating the drums during the operation of the apparatus.

The first drum 16 is positioned on one side of the feedstream 19 of articles 4 with portions of the first drum 16 being at a lower elevation than the feedstream 19 of articles 4. The first drum 16 is rotatable for moving its associated protrusion 20 into the concave portion of oriented (0) articles 4 (see FIG. 3). The first drum 16 is rotated in a direction whereby the protrusion 20 enters the concave portion of article 4 and moves therein in a direction generally from the first location 6 toward the second location 8.

Referring to FIG. 4, where an unoriented (U) article 4 is at the second location 8, the protrusion 20 contacts a portion of the unoriented (U) article 4 and moves at least a portion of the said unoriented article generally upwardly to a preselected elevation.

Referring to FIGS. 3 and 4, the second ejection drum 18 is positioned on an opposed side of the feedstream of articles 4 at the second location and at an elevation greater than the feedstream of article 4 resting on the first chute 2. The second drum 18 has at least one protrusion 20' extending outwardly therefrom and is rotatable.

Referring to FIG. 3, the protrusion 20' of the second drum 18 does not contact oriented (0) articles 4 resting on the first chute 2 which passes therebetween in a direction from the second to a third location 24. Referring to FIG. 4, unoriented (U) articles 4, however, are raised by the first drum 16 into the pathway of the protrusion 20' of the second rotating drum 18. The protrusion 20' of the second drum 18 contacts the raised unoriented (U) article 4 and ejects said article from the feedstream of articles.

The type of ejection of unoriented (U) articles 4 is dependent upon the positioning of the second drum 18 relative to the first chute.

FIGS. 3 and 4 show the axis 26, 28 of respective first and second drums 16, 18 oriented substantially perpendicularly to the first chute 2. In this embodiment, unoriented (U) articles 4 are moved by the protrusions 20' of the second drum 18 from the first chute 2 to a location resting upon downstream oriented (0) articles 4 as shown in FIGS. 1 and 2.

In this preferred embodiment, a directing element 30 is connected to the first chute 2 at the third location 24, extends downwardly, angularly across the first chute 2 at an elevation higher than oriented (0) articles 4 resting on the first chute 2 and in the pathway of unoriented (U) articles ejected from the feedstream by the second drum 18. The unoriented (U) articles 4 contact the directing element 30 and are directed outwardly from the oriented (0) articles 4 resting on the first chute 2.

In another embodiment (not shown), axis 28 of the second drum 18 can be angularly disposed relative to the first chute 2 and the axis 26 of the first drum 16 at which orientation the protrusion 20' will cause the raised unoriented (U) articles to be directly moved outwardly from the article feedstream 19.

Referring to FIG. 1, a second chute 34 is associated with the first chute 2 and extends outwardly from the first chute at the third location 24 for receiving unoriented (U) articles ejected from the feedstream 19 by the second drum 18 and directing said articles outwardly from the first chute 2.

As shown in FIGS. 3 and 4, there preferably can be a plurality of protrusions 20, 20' on the drums 16, 18 thereby avoiding the necessity of rotating the drums with a great deal of accuracy and/or synchronizing the rotation of the drums 16, 18.

In the method of this invention, articles 4 are passed from an article source (not shown) on to the first chute 2 where the article gravitationally moves in single file from the first location 6 to the second location.

Oriented (0) articles 4 at the second location pass between the drums and move to the third location 24.

Unoriented (U) articles 4 at the second location are contacted by a protrusion 20 of the first drum 16 and raised upwardly to a preselected elevation at which elevation a protrusion 20' of the second drum 18 contacts a portion of the raised article 4 and ejects said article from the feedstream 19 of articles, preferably onto the downstream articles, at which location they are contacted by the directing element 30 and moved outwardly from the feedstream in response to the angle of contact and the movement of underlying articles. The second chute 24 preferably extends generally downwardly from the first chute 2 for gravitationally moving the articles 4 outwardly from the first chute 2.

Other modifications and alterations of this invention will become apparent to those skilled in the art from the foregoing discussion and accompanying drawing, and it should be understood that this invention is not to be unduly limited thereto.

What is claimed is:

1. An apparatus for ejecting unoriented articles having a concave side and a convex side from a feedstream of the articles, comprising:

first means for passing a feedstream of articles from a first location to a second location;

second means for contacting unoriented articles at the second location, moving each of said unoriented articles upwardly to a location at which said unoriented articles are resting upon and being moved by the feedstream of articles downstream of the second location, contacting the elevated articles, and ejecting said articles, said second means comprising first and second rotatable ejector drums each having at least one protrusion and being positioned at opposed sides of the first means, said first drum having portions positioned at a lower elevation than said first means and said second drum being at a higher elevation than said first means; and power means for rotating the drums.

2. An apparatus, as set forth in claim 1, wherein the first means comprises a chute having a floor and side walls, and extending downwardly in a direction from the first toward the second location.

3. An apparatus, as set forth in claim 2, wherein the chute is downwardly extending at an angle in the range of about 10° to about 60° relative to the horizontal.

4. An apparatus, as set forth in claim 2, including a second chute extending outwardly from the first chute at a third location downstream of the second location.

5. An apparatus, as set forth in claim 1, wherein the drums each have an axis with each axis oriented substantially perpendicularly to the first means and including a directing element connected to the first means at a third location downstream of the second location, said element extending across the first means at an elevation higher than oriented articles resting on the chute and in the pathway of unoriented articles ejected from the feedstream by the first and second drums for contacting said ejected articles and directing said articles outwardly from the oriented articles.

6. A method for ejecting unoriented articles having a concave side and an opposed convex side from a feedstream of the articles, comprising:

passing a feedstream of the articles in single file from a first location to a second location;

contacting a portion of an unoriented article and moving said article upwardly relative to the feedstream and to a location at which said unoriented article is resting upon and being moved by the feedstream of articles downstream of the second location;

contacting a portion of the elevated, unoriented article and ejecting said unoriented article from the feedstream.

7. A method, as set forth in claim 6, including gravitationally passing the feedstream of articles downwardly from the first location to the second location.

8. A method, as set forth in claim 7, wherein the feedstream moves downwardly at an angle in the range of about 10° to about 60° relative to the horizontal.

9. A method, as set forth in claim 6, wherein the ejected articles are moved into a chute and gravitationally moving the ejected articles on the chute outwardly from the feedstream.

* * * * *

UNITED STATES PATENT AND TRADEMARK OFFICE
CERTIFICATE OF CORRECTION

PATENT NO. : 3,811,551

DATED : May 21, 1974

INVENTOR(S) : William R. Eddy

It is certified that error appears in the above-identified patent and that said Letters Patent are hereby corrected as shown below:

In the Heading - after the inventor's name, delete "Phillys Petroleum, Kansas City, Mo." and insert --- Phillips Petroleum Company, Bartlesville, Oklahoma ---.

Column 3, claim 1, lines 20 and 21, delete "having a concave side and a convex side"; line 22, delete "the"; after "articles" insert --- having a concave side and a convex side, said feedstream containing unoriented articles and oriented articles, ---; line 23, after "passing" delete "a" and insert --- said ---; line 25, after "contacting" insert --- individual ---; line 26, after "of" delete "said" and insert --- the thus contacted ---; line 27, after "which" delete "said" and insert --- the thus elevated ---; line 29, before "articles" insert --- oriented ---; line 30, before "elevated" delete "the" and insert --- said ---; line 31, before "articles" delete "said" and insert --- the thus contacted elevated ---.

Column 4, claim 6, lines 19 and 20, delete "having a concave side and an opposed convex side"; line 21, after "of" delete "the"; after "articles" insert --- having a concave side and an opposed convex side, said feedstream containing oriented articles and unoriented articles ---; line 22, after "passing" delete "a" and insert --- said ---; line 25, after "moving" delete "said" and insert --- the thus contacted unoriented ---; line 26, after "which" delete "said" and insert --- the thus elevated ---; line 28, before "articles" insert --- oriented ---; line 30, after "of" delete "the" and insert --- each ---; line 31, after "ejecting" delete "said" and insert --- the thus contacted elevated ---.

Signed and Sealed this

Seventeenth Day of May 1977

[SEAL]

*Attest:*

RUTH C. MASON
*Attesting Officer*

C. MARSHALL DANN
*Commissioner of Patents and Trademarks*